(No Model.)
F. B. WALLACE.
NUT LOCK.
No. 518,474. Patented Apr. 17, 1894.
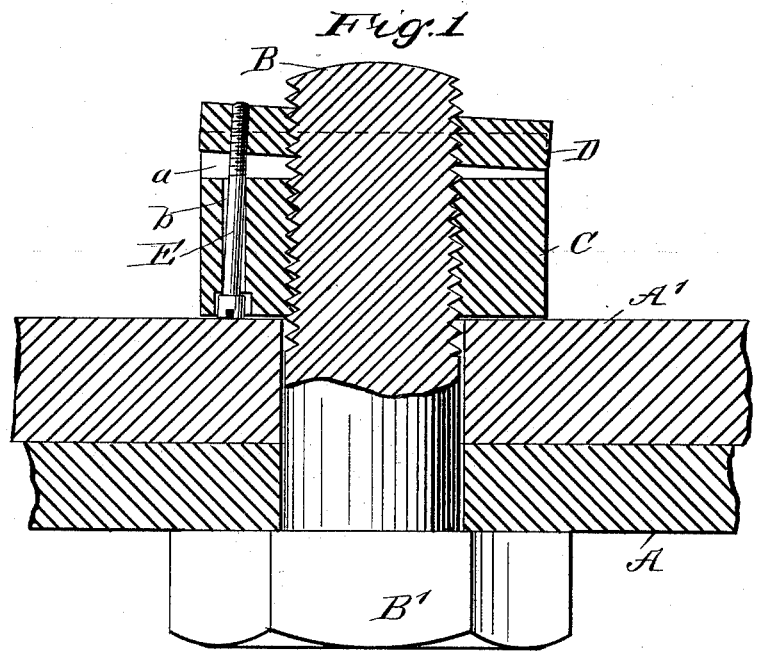
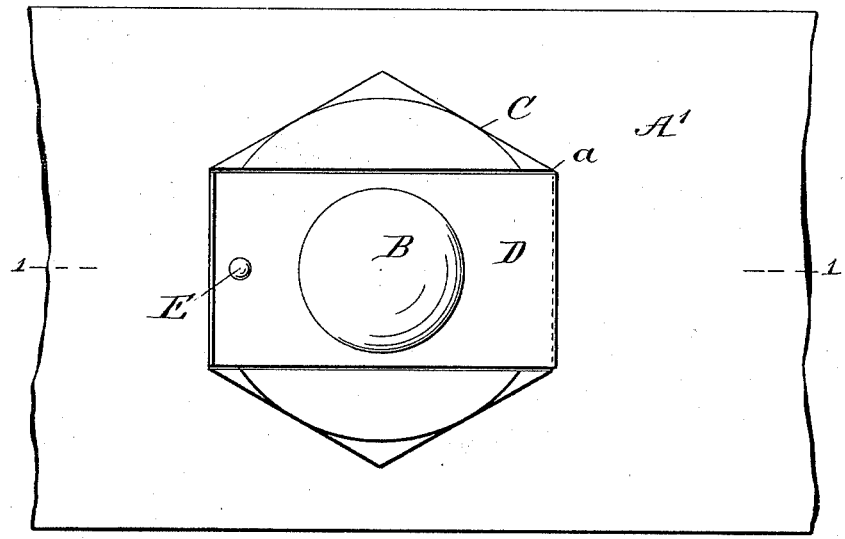
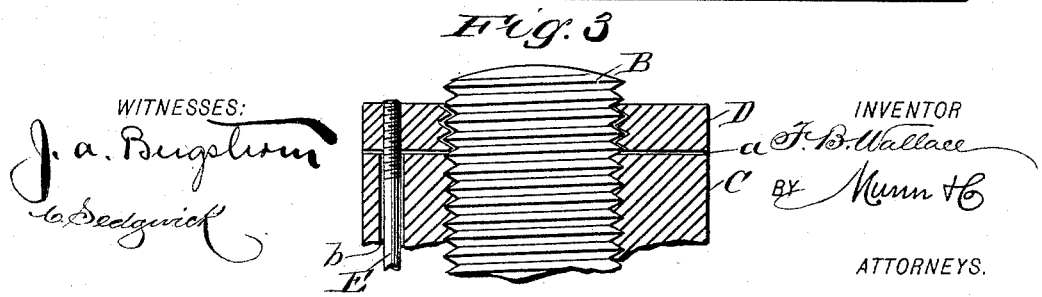
WITNESSES:
J. A. Bergstrom
C. Sedgwick
INVENTOR
F. B. Wallace
BY Munn & Co
ATTORNEYS.
THE NATIONAL LITHOGRAPHING COMPANY,
WASHINGTON, D. C.

UNITED STATES PATENT OFFICE.

FREDRICK B. WALLACE, OF ORION, MICHIGAN, ASSIGNOR TO HIMSELF AND C. HOMER SPENCER, OF SAME PLACE.

NUT-LOCK.

SPECIFICATION forming part of Letters Patent No. 518,474, dated April 17, 1894.

Application filed September 2, 1893. Serial No. 484,625. (No model.)

*To all whom it may concern:*

Be it known that I, FREDRICK B. WALLACE, of Orion, in the county of Oakland and State of Michigan, have invented a new and useful Improved Nut-Lock, of which the following is a full, clear, and exact description.

My invention relates to improvements in nut locks for threaded bolts, and has for its object to provide a novel, simple and reliable device of the character indicated, which is applicable to nuts of any peripheral form, and that will afford means to secure the nut on a threaded bolt in contact with a hard surface, lock the nut and bolt from accidental release, and avoid injury to the threads of the bolt or nut, permitting the re-use of both for an indefinite number of times.

To these ends my invention consists in the peculiar construction and combination of parts, as is hereinafter described and claimed.

Reference is to be had to the accompanying drawings forming a part of this specification, in which similar letters of reference indicate corresponding parts in all the figures.

Figure 1 is a sectional side view of the improved nut locking device, applied to a nut and a bolt that are arranged to clamp two pieces of material together. Fig. 2 is a plan view of the improvement and engaged parts shown in Fig. 1; and Fig. 3 is a side sectional view of the improvement applied to a nut and bolt shown in part, showing the relative position of parts when the nut lock is released to permit the nut to be removed from the bolt.

In the drawings, A A' represent two perforated pieces of material that are to be clamped together by a bolt B and nut C; the parts A A' may be portions of machinery or any structure that requires the employment of a bolt and nut to secure them together. The screw threaded bolt B, may be cylindrical or have any other form of body, transversely considered, near the head B', which may be square or polygonal in contour as may be preferred. The face of the nut C farthest removed from the material impinged by the nut in service, is grooved across its center of width, so as to locate the threaded hole in the nut in said channel a, which latter is proportioned in width to exceed the diameter of said hole a proper degree. A locking block D, is furnished that loosely fits within the nut channel a, and preferably is made to conform in length with the width of the nut C. The locking block D, is perforated at a point and in a direction that will adapt it to coincide with and produce an extension of the hole in the nut when the block is in place on the latter. A thread of similar pitch with that of the bolt and nut is formed in the perforation of the block D, so that the assembled nut and block may be freely screwed upon the bolt body when this is desired, or be removed if the parts are adjusted as shown in Fig. 3.

At a suitable distance from the threaded hole in the nut and locking block, a smaller hole b, is formed in the nut, and an aligning perforation in the block, for the reception of a tilting pin E. The said pin fits loosely in the hole b, but is secured in the perforation in the block. Preferably the hole b, is formed in alignment with the threaded hole in the nut C, as represented in Figs. 1, and 3 but this is not imperative, as the device will effectively operate if the holes named are not exactly in alignment. The tilting pin E, is made of a greater length than the combined thickness of the nut C and locking block D, and in use said pin is adjusted to slightly project from the face of the nut that is nearest the material on which said nut is to press.

It will be seen that when the parts are adjusted as has been described, and the nut C is screwed down upon the piece A'; the nearest end of the pin E, will engage with the surface of the same, slightly in advance of the nut, which when screwed down tightly upon the said piece A', will cause the tilting pin to tip the locking block D, and bind its thread end upon the bolt thread. As the block is seated in the channel a of the nut C, it will be evident that the latter will be securely locked from an accidental retrograde movement, but by the use of a proper wrench may be unscrewed without injury to it or other parts of the device, the bolt thread also remaining uninjured. The tilting pin E is preferably secured in the locking block D, by threading one end and screwing it into a tapped hole in said block, as this enables the adjustment of the pin as to degree of projection from the face of the nut C, and thus increase or diminish the tilting action of the pin as occasion may require.

Having thus fully described my invention, I claim as new and desire to secure by Letters Patent—

1. The combination, with the nut proper, having a transverse channel in its outer face, and a hole, b, parallel to the bolt hole, of a block, D, adapted to fit loosely in said channel, and having a central threaded bolt-hole, and a device attached to the block and projecting through the said hole, b, in which it fits loosely, as shown and described.

2. The combination with a nut perforated at one side of its threaded hole, and channeled transversely on one face, of an independent locking block perforated and threaded to conform with the bolt hole in the nut and seated in the channel, and a tilting pin fast in the block and fitted loosely in the side perforation in the nut and projecting beyond the inner face of the latter, substantially as described.

FREDRICK B. WALLACE.

Witnesses:
JOHN A. NEAL,
HERBERT S. HOLDEN.